(12) United States Patent
Sekiguchi et al.

(10) Patent No.: US 6,366,039 B1
(45) Date of Patent: Apr. 2, 2002

(54) EXCIMER LASER DEVICE

(75) Inventors: Shinichi Sekiguchi, Yokohama; Hiroyuki Shinozaki, Fujisawa; Toshimitsu Barada, Tokyo; Toshiharu Nakazawa, Chigasaki, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/553,466

(22) Filed: Apr. 19, 2000

(30) Foreign Application Priority Data

Apr. 21, 1999 (JP) .......................................... 11-113972

(51) Int. Cl.⁷ ................................................ H01S 3/02
(52) U.S. Cl. ....................... 318/268; 318/463; 372/38.1
(58) Field of Search ................................ 318/268, 461, 318/463, 464; 372/37, 38.1

(56) References Cited

U.S. PATENT DOCUMENTS 5,586,134 A * 12/1996 Das et al. ..................... 372/38
5,770,933 A   6/1998 Larson et al.
6,026,103 A * 6/2000 Oliver et al. .................. 372/37

* cited by examiner

*Primary Examiner*—Bentsu Ro
(74) *Attorney, Agent, or Firm*—Armstrong, Westerman & Hattori, LLP

(57) ABSTRACT

An excimer laser device which is capable of keeping the rotational speed of a fan constant and uniformizing a laser gas flow between main discharge electrodes even when the pressure of a laser gas filled in a casing varies. The excimer laser device includes a casing filled with a laser gas; a pair of main discharge electrodes disposed in the casing for producing an electric discharge to discharge-pump the laser gas at a high repetition rate; a fan for producing a high-speed laser gas flow between the main discharge electrodes; bearings, the fan having a rotatable shaft rotatably supported by the bearings; a motor for actuating the fan; a rotational speed detecting device for detecting a rotational speed of the fan; and control device for controlling at least one of a voltage and a frequency to be supplied to the motor based on the rotational speed of the fan detected by the rotational speed detecting device, thereby to control the rotational speed of the fan at a constant level.

11 Claims, 8 Drawing Sheets

RESULTS OF CORROSION RESISTANCE TEST ON PERMALLOY AGAINST FLUORINE

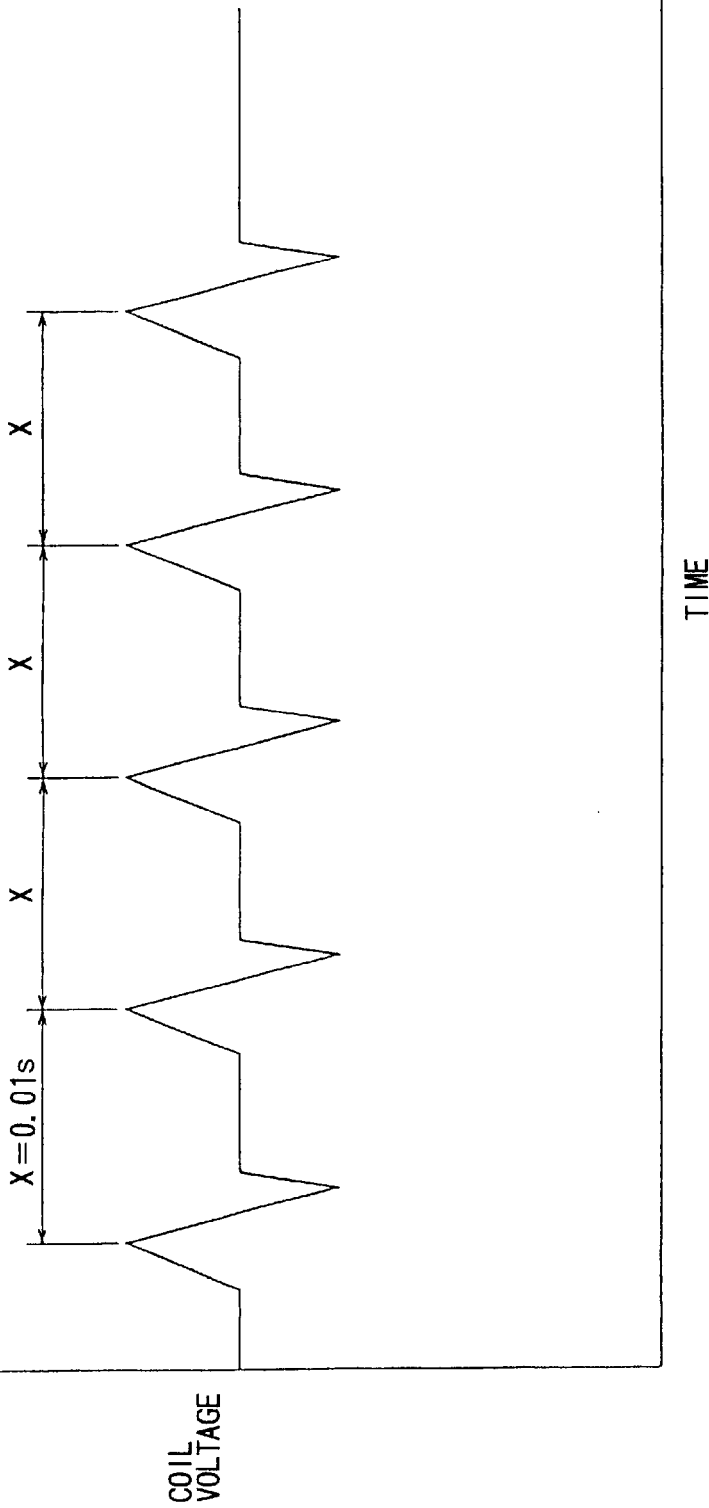

EXCIMER LASER DEVICE

BACKGROUND OF THE INVENTION

1. Field of the Invention

The present invention relates to an excimer laser device, and more particularly to an excimer laser device having a controller for detecting the rotational speed of a fan for generating a laser gas flow and controlling the rotational speed of the fan at a constant level.

2. Description of the Related Art

FIG. 1 of the accompanying drawings schematically shows a conventional excimer laser device. As shown in FIG. 1, the conventional excimer laser device has a casing 101 filled with a laser gas, a preliminary ionizing electrode (not shown) disposed in the casing 101 for preliminarily ionizing the laser gas, and a pair of main discharge electrodes 102 disposed in the casing 101 for producing an electric discharge to make it possible to oscillate a laser beam. The casing 101 also houses therein a cross-flow fan 103 for producing a high-speed gas flow between the main discharge electrodes 102.

The cross-flow fan 103 has a rotatable shaft 104 projecting from opposite ends thereof and rotatably supported by a plurality of radial magnetic bearings 106, 107, 108 disposed on opposite sides of the casing 101 and an axial magnetic bearing 109 mounted on the radial magnetic bearing 106. The rotatable shaft 104 can be rotated by an induction motor 110 connected to an end thereof and disposed between the radial magnetic bearings 107, 108. The casing 101 has a pair of windows 105 on its opposite ends for emitting the laser beam out of the casing 101.

In the conventional excimer laser device, the laser gas contains a highly reactive halogen gas, e.g., a fluorine gas. Therefore, various chemical reactions are caused in the casing 101, producing impurities such as HF, $CF_4$, etc. These impurities are responsible for a reduction in the performance of the laser beam.

In order to enable the excimer laser device to output a laser beam having an average power of several tens of watts, it is necessary to generate highly repeated electric discharges at a frequency of several kHz between the main discharge electrodes 102.

However, such often repeated electric discharges tend to cause wear on the main discharge electrodes 102 in a short period of time, resulting in a reduction in the performance of the laser beam. As a result, the excimer laser device fails to emit a laser beam which is stable over a long period of time.

One solution to the above problem is to control the discharge voltage applied between the main discharge electrodes 102, 102 and to control the pressure of the filled laser gas to maintain the laser beam performance at a constant level or higher for a long period of time.

If the pressure of the filled laser gas varies, then the load on the cross-flow fan 103 varies, and hence the rotational speed thereof also varies. Specifically, if the pressure of the filled laser gas increases, the load on the cross-flow fan 103 also increases, resulting in an increase in the slippage of the induction motor 110 which causes the rotational speed of the cross-flow fan 103 to decrease. When the rotational speed of the cross-flow fan 103 is reduced, the speed of flow of the lower gas between the main discharge electrodes 102 is reduced, with the consequence that the excimer laser device cannot oscillate at a high repetition rate.

The above drawback may be eliminated by setting the rotational speed of the cross-flow fan 103 in a high speed range for canceling out the speed reduction due to the increase of slippage of the motor 110. However, this approach is disadvantageous in that the power consumption by the cross-flow fan 103 increases when the pressure of the laser gas is high (the power consumption by the cross-flow fan 103 is proportional to the cube of the rotational speed thereof). An alternative solution is to use a slippage-free synchronous motor, which is, however, complex in structure and high in cost.

SUMMARY OF THE INVENTION

It is therefore an object of the present invention to provide an excimer laser device which is capable of keeping the rotational speed of a fan constant and maintaining uniformity in a laser gas flow between main discharge electrodes even when the pressure of a laser gas filled in a casing varies. Also, the excimer laser device can be oscillated at a high repetition rate even when the pressure of the filled laser gas varies, and consumes a reduced amount of power.

According to the present invention, there is provided an excimer laser device comprising a casing filled with a laser gas, a pair of main discharge electrodes disposed in the casing for producing an electric discharge to discharge-pump the laser gas at a high repetition rate, a fan for producing a high-speed laser gas flow between the main discharge electrodes, bearings, the fan having a rotatable shaft rotatably supported by the bearings, a motor for actuating the fan, rotational speed detecting device for detecting a rotational speed of the fan, and control device for controlling at least one of a voltage and a frequency to be supplied to the motor based on the rotational speed of the fan detected by the rotational speed detecting device, thereby to control the rotational speed of the fan at a constant level.

Because at least one of the voltage and the frequency to be supplied to the motor is controlled based on the rotational speed of the fan detected by the rotational speed detecting device, thereby to control the rotational speed of the fan at a constant level, the rotational speed of the fan can be made constant irrespective of the pressure of the sealed laser gas. The excimer laser device can therefore operate stably for oscillation at a high repetition rate. Furthermore, because the motor is operated efficiently at all times, the power consumed by the fan can be reduced.

The rotational speed detecting device may comprise a disk made of a magnetic material and having at least one slit defined therein, the disk being fixedly mounted on the rotational shaft of the fan and disposed in a hermetically sealed space communicating with the casing, a magnetic body disposed outside of the casing in confronting relationship to the disk with a can interposed therebetween, the magnetic body being narrower than the slit and having at least two protrusions, and a coil mounted on the magnetic body for inducing an electromotive force upon rotation of the disk, the control device comprising means for detecting the rotational speed of the fan from the electromotive force induced across the coil.

The rotational speed detecting device thus constructed is capable of detecting the rotational speed of the fan accurately. As the magnetic body with the coil mounted thereon is disposed outside of the casing with the can interposed therebetween, the coil which has poor corrosion resistance to the laser gas is not exposed to the laser gas, and does not deteriorate the laser gas.

The magnetic body partly or wholly comprises a permanent magnet. The magnetic body thus arranged is effective in increasing the flux density of the magnetic flux of a magnetic circuit which is made up of the magnetic body and the disk.

Accordingly, the electromotive force induced across the coil is increased, resulting in an increased ability to detect the rotational speed of the fan. Because a bias current supplied to the coil for generating the magnetic flux can be reduced or eliminated, the rotational speed detecting device can be simplified in circuit arrangement and its power consumption can be reduced.

Alternatively, the rotational speed detecting device may comprise an air flow speed sensor disposed in the casing for detecting an air flow speed, thereby detecting the rotational speed of the fan from the air flow speed detected by the air flow speed sensor.

The air flow speed sensor can directly measure an air flow speed produced by the fan, and the control device can detect the rotational speed of the fan from the detected air flow speed, and control the rotational speed of the fan in order to keep the air flow speed constant.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram illustrative of the manner in which an electromotive force generated across a coil of the rotational speed detecting circuit varies;

DETAILED DESCRIPTION OF THE PREFERRED EMBODIMENTS

An excimer laser device according to an embodiment of the present invention will be described below with reference to FIGS. 2 and 3.

Figure 1:
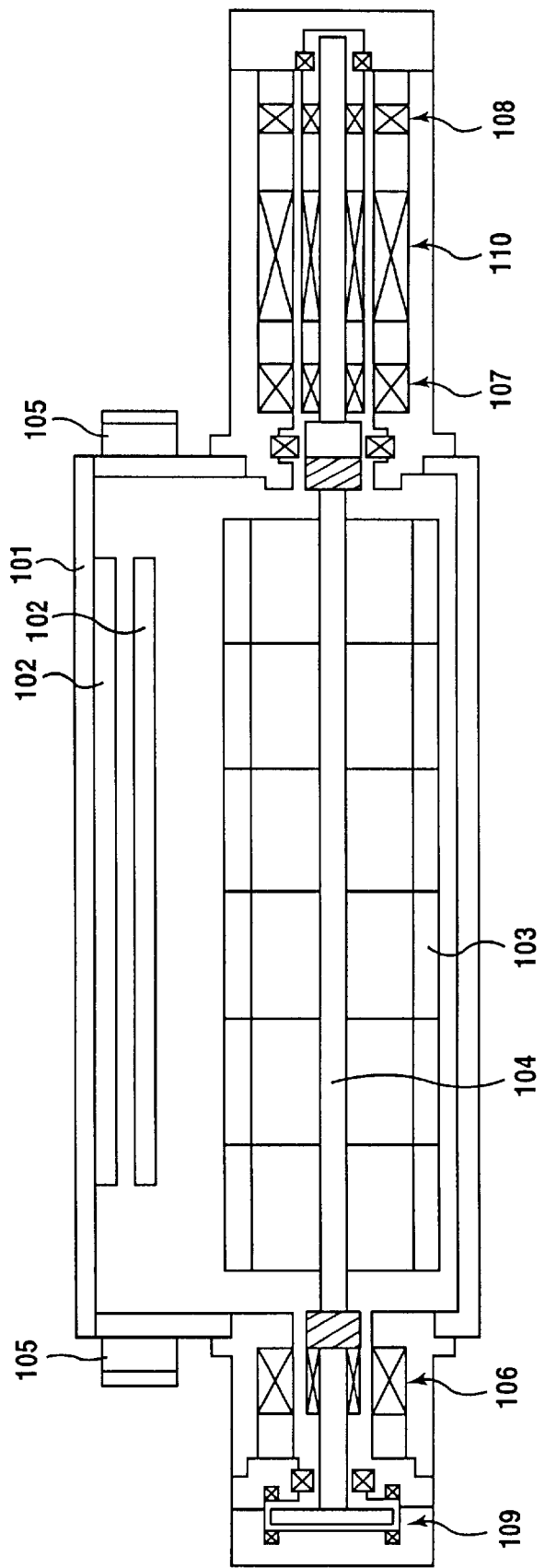
FIG. 1 is an axial cross-sectional view of a conventional excimer laser device.
Figure 2:
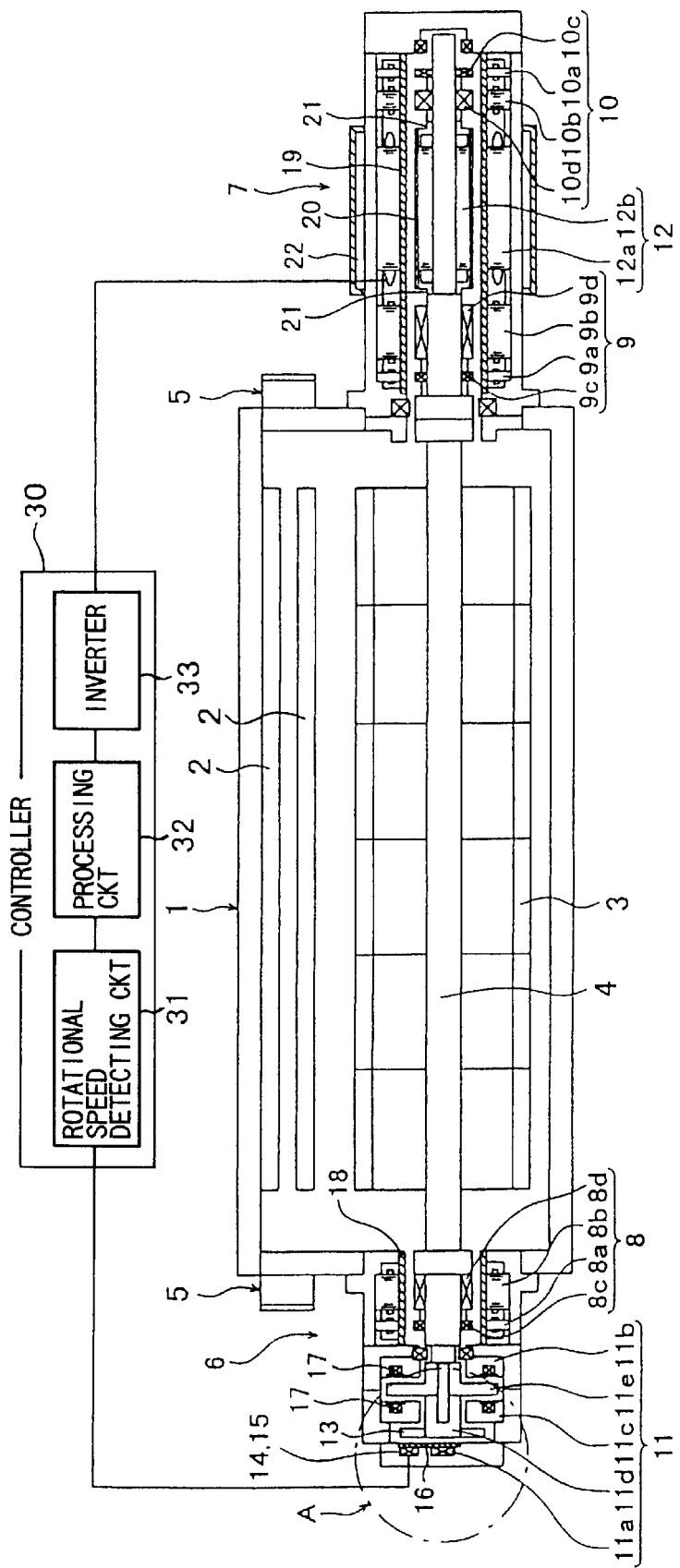
FIG. 2 is an axial cross-sectional view of an excimer laser device according to an embodiment of the present invention.
Figure 3:
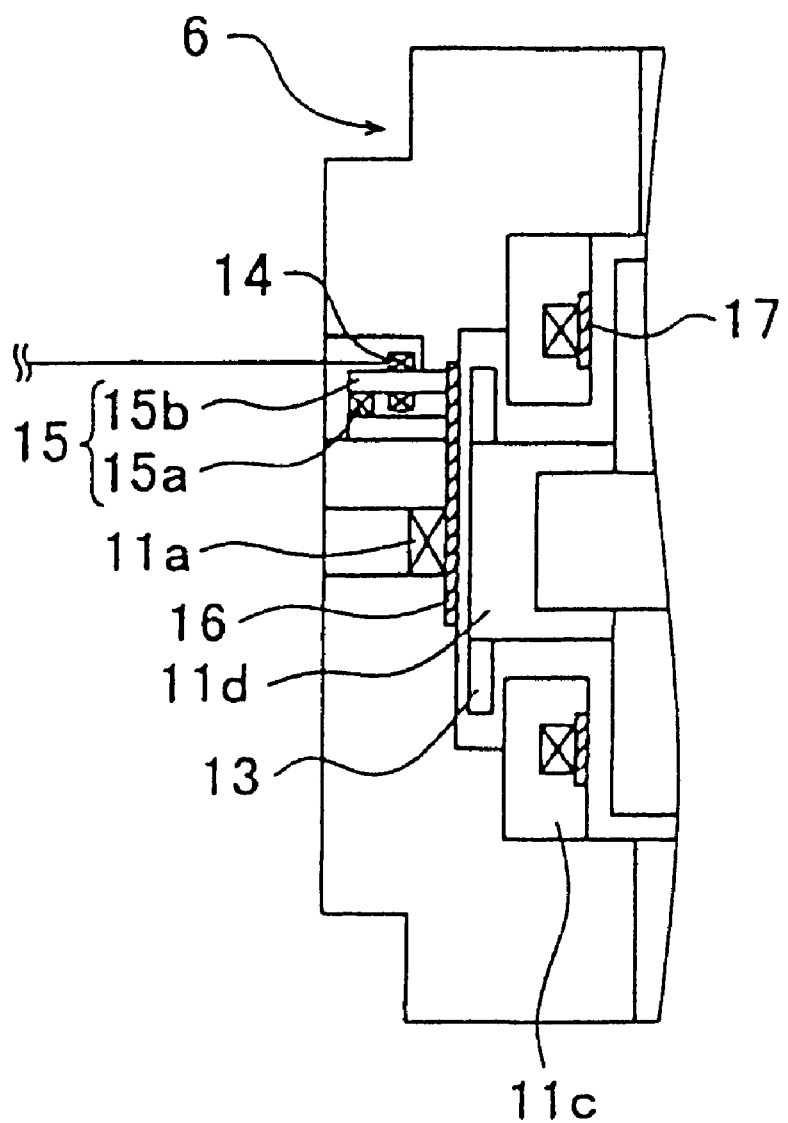
FIG. 3 is an enlarged fragmentary view of an encircled portion A of the excimer laser device shown in FIG. 2.

As shown in FIGS. 2 and 3, the excimer laser device according to an embodiment of the present invention comprises a casing 1 filled with a laser gas, a preliminary ionizing electrode (not shown) disposed in the casing 1 for preliminarily ionizing the laser gas, and a pair of main discharge electrodes 2 disposed in the casing 1 for producing an electric discharge to make it possible to generate an oscillation of a laser beam. The casing 1 also houses therein a cross-flow fan 3 for producing a high-speed gas flow between the main discharge electrodes 2.

When a high voltage is applied between the main discharge electrodes 2, the laser gas between the main discharge electrodes 2 is discharge-pumped to generate an oscillation of a laser beam. The generated laser beam is emitted out of the casing 1 through windows 5 mounted on opposite ends of the casing 1. When the laser gas is discharge-pumped, the laser gas is deteriorated and its discharge characteristics are lowered to the extent that no repetitive pumping could be performed.

Therefore, the cross-flow fan 3 is operated to circulate the laser gas in the casing 1 for thereby replacing the laser gas between the main discharge electrodes 2 in each discharge cycle for stable repetitive pumping.

The cross-flow fan 3 has a rotatable shaft 4 extending axially therethrough and projecting from opposite ends thereof. The rotatable shaft 4 is rotatably supported by a plurality of radial magnetic bearings 8, 9, 10 and an axial magnetic bearing 11 which are disposed in a cylindrical bearing housing 6 and a cylindrical motor housing 7 that are mounted on opposite sides of the casing 1. The rotatable shaft 4 can be rotated by an induction motor 12 disposed in the motor housing 7.

An axial displacement sensor target 11d and a slit disk 13 are mounted on an end of the rotatable shaft 4 in the bearing housing 6, and placed in a hermetically sealed space which communicates with the casing 1. Each of the axial displacement sensor target lid and the slit disk 13 is made of permalloy (an Fe—Ni alloy containing 30 to 80% of Ni) which is highly corrosion-resistant to fluorine contained in the laser gas.

Figure 4:
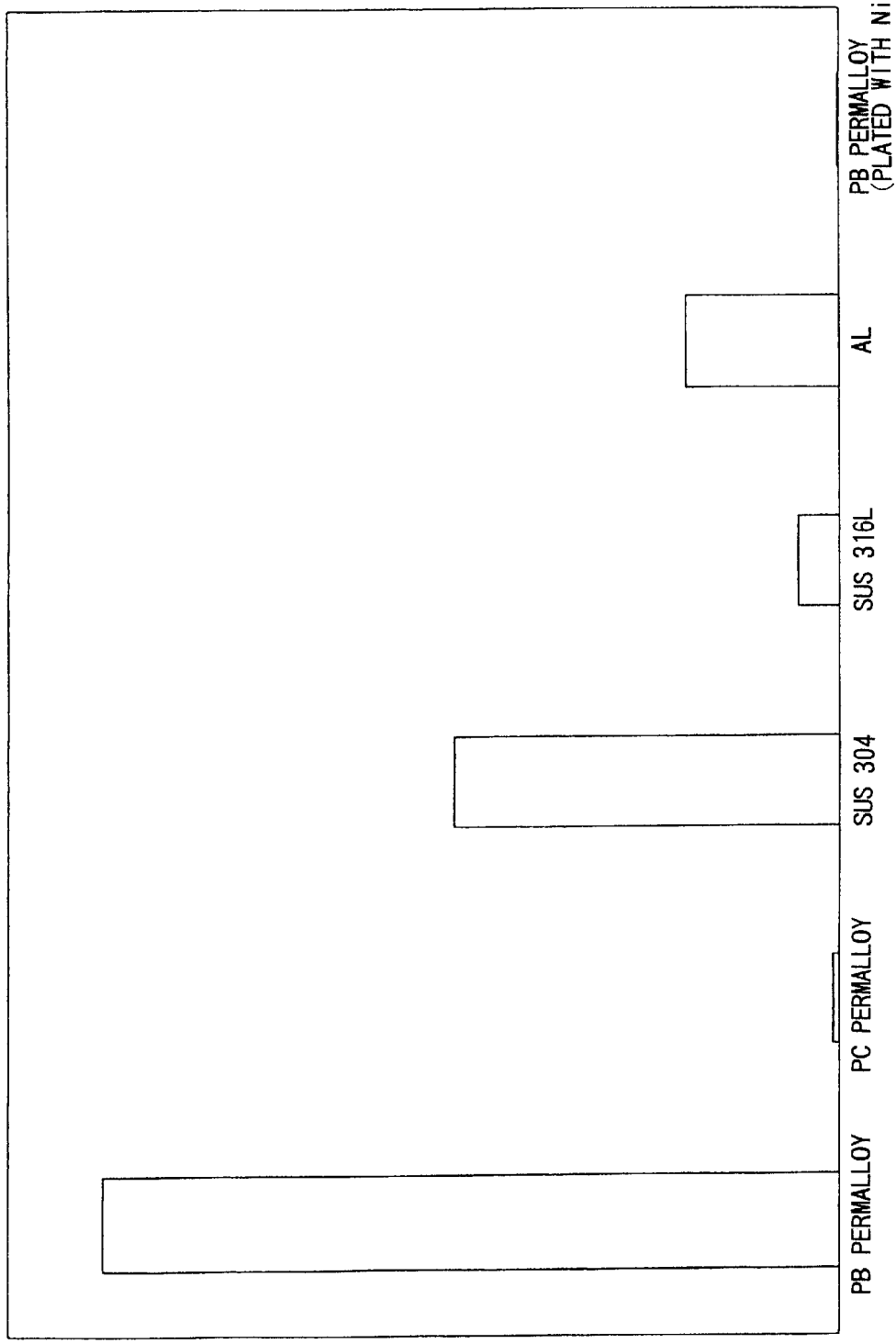
FIG. 4 is a diagram showing the results of a corrosion resistance test on permalloy against fluorine.

FIG. 4 shows the results of a corrosion resistance test on permalloy against fluorine. As shown in FIG. 4, permalloy has better corrosion resistance as the content of Ni is higher.

Since PC permalloy with an Ni content of 80% (JIS C2531) exhibits almost the same corrosion resistance as austenitic stainless steel SUS316L, it is preferable to construct the axial displacement sensor target lid and the slit disk 13 of PC permalloy.

Figure 5A:
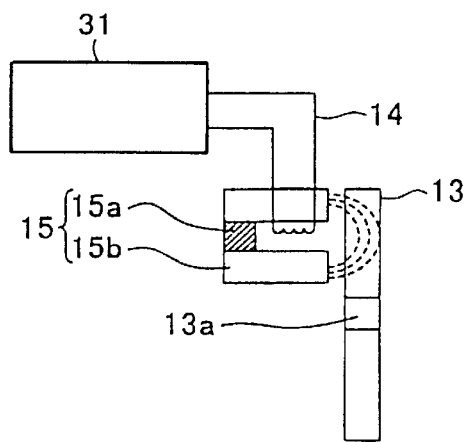
FIGS. 5A–5F are views illustrative of the manner in which a rotational speed detecting circuit for detecting the rotational speed of a cross-flow fan of the excimer laser device operates.

The bearing housing 6 accommodates a U-shaped magnetic member 15 on which an axial displacement sensor 11a and a coil 14 are mounted. The U-shaped magnetic member 15 is positioned in confronting relationship to the axial displacement sensor target lid and the slit disk 13. A thin-walled cylindrical can 16 made of austenitic stainless steel such as SUS316L is secured as by welding to a surface of the U-shaped magnetic member 15 which is exposed to the laser gas. The U-shaped magnetic member 15 on which the axial displacement sensor 11a and the coil 14 are mounted is placed out of the hermetically sealed space by the thin-walled cylindrical can 16. Accordingly, the axial displacement sensor 11a and the coil 14 which are relatively poor in corrosion resistance are held out of contact with the laser gas. As shown in FIGS. 5A and 5D, the U-shaped magnetic member 15 comprises a permanent magnet 15a and a yoke 15b.

The axial magnetic bearing 11 comprises a right solenoid 11b and a left solenoid 11c which are axially spaced from each other in axially confronting relationship to each other, and mounted in the bearing housing 6.

The right solenoid 11b and the left solenoid 11c, which are positioned in contact with the laser gas, are preferably made of a magnetic material having a high saturation flux density. Therefore, the right solenoid 11b and the left solenoid 11c have respective cores made of PB permalloy whose saturation flux density is greatest among permalloys. The right solenoid 11b and the left solenoid 11c have respective coils inserted in coil slots defined in the cores. The right solenoid 11b and the left solenoid 11c are secured as by welding to respective thin-walled cylindrical cans 17 made of austenitic stainless steel such as SUS316L, such that the coils are held out of contact with the laser gas. The cores of the right solenoid 11b and the left solenoid 11c have surfaces held in contact with the laser gas and processed for corrosion resistance, e.g., plated with an Ni coating. The PB permalloy can be made as corrosion-resistant as the PC permalloy by being plated with an Ni layer.

The radial magnetic bearing 8 comprises a displacement sensor 8a and a solenoid 8b which are housed in the bearing housing 6. A thin-walled cylindrical can 18 made of austenitic stainless steel such as SUS316L is inserted in the displacement sensor 8a and the solenoid 8b and has its axially opposite ends secured in place as by welding. The displacement sensor 8a and the solenoid 8b, which comprise silicon steel sheets and copper wire coils that are poor in corrosion resistance to the laser gas, are held out of contact with the laser gas by the thin-walled cylindrical can 18. Accordingly, the displacement sensor 8a and the solenoid 8b are protected against corrosion by the laser gas and prevented from contaminating the laser gas.

The radial magnetic bearing 8 also has a displacement sensor target 8c and a solenoid target 8d fixedly mounted on the rotatable shaft 4, and the axial magnetic bearing 11 has a solenoid target 11e fixedly mounted on the rotatable shaft 4. The displacement sensor target 8c, the solenoid target 8d, and the solenoid target 11e are disposed in the hermetically sealed space in confronting relationship to the displacement sensor 8a, the solenoid 8b, the right solenoid 11b, and the left solenoid 11c. The displacement sensor target 8c, the solenoid target 8d, and the solenoid target 11e are made of permalloy (an Fe—Ni alloy containing 30 to 80% of Ni) which is highly corrosion-resistant to fluorine contained in the laser gas.

The displacement sensor target 8c and the solenoid target 8d cause an eddy current loss due to a magnetic field change produced upon rotation of the shaft 4. In order to reduce the eddy current loss, the displacement sensor target 8c and the solenoid target 8d are usually constructed of laminated thin sheets. However, a gas trap is formed between those laminated thin sheets, tending to contaminate the laser gas. If the surfaces of the laminated thin sheets cannot be plated with a uniform, highly adhesive Ni layer, then each of the displacement sensor target 8c and the solenoid target 8d may be constructed as an integral body of permalloy. The solenoid target 11e is constructed as an integral body of permalloy as its magnetic field does not change upon rotation of the shaft 4.

The radial magnetic bearing 9 comprises a displacement sensor 9a and a solenoid 9b. The motor 12 has a motor stator 12a, and the radial magnetic bearing 10 comprises a displacement sensor 10a and a solenoid 10b. The displacement sensor 9a, the solenoid 9b, the motor stator 12a, the displacement sensor 10a, and the solenoid 10b are placed in the motor housing 7 in fixed relatively positional relationship, and mounted on a thin-walled cylindrical can 19 made of austenitic stainless steel such as SUS316L which is inserted in the motor housing 7 has its axially opposite ends secured in place as by welding. The displacement sensor 9a, the solenoid 9b, the motor stator 12a, the displacement sensor 10a, and the solenoid 10b, which comprise silicon steel sheets and copper wire coils that are poor in corrosion resistance to the laser gas, are held out of contact with the laser gas by the thin-walled cylindrical can 19.

A water-cooling jacket 22 is mounted on an outer circumferential surface of the motor housing 7 for absorbing a heat loss of several 100 W generated by the motor 12. The motor stator 12a has coils impregnated with an insulating material for efficiently dissipating the heat generated due to the resistance of the coils. Therefore, the motor stator 12a has an increased ability to radiate the heat from the coils for preventing the motor 12 from burning.

The radial magnetic bearing 9 also has a displacement sensor target 9a and a solenoid target 9d. The motor 12 has a motor rotor 12b, and the radial magnetic bearing 10 has a displacement sensor target 10c and a solenoid target 10d. The displacement sensor target 9c, the solenoid target 9d, the motor rotor 12b, the displacement sensor target 10c, and the solenoid target 10d are placed in the hermetically sealed space in confronting relationship to the displacement sensor 9a, the solenoid 9b, the motor stator 12a, the displacement sensor 10a, and the solenoid 10b. The displacement sensor targets 9c, 10c and the solenoid targets 9d, 10d are made of permalloy (an Fe—Ni alloy containing 30 to 80% of Ni), as with the displacement sensor target 8c and the solenoid target 8d.

The motor rotor 12b is constructed of laminated silicon steel sheets and aluminum.

Accordingly, the motor rotor 12b cannot be plated with a uniform, highly adhesive Ni layer for corrosion resistance. For this reason, a cylindrical can 20 is mounted on the outer circumferential surface of the motor rotor 12b and secured as by welding to side plates 21 on axially opposite ends of the motor rotor 12b, and the side plates 21 are secured as by welding to the rotatable shaft 4. The can 20 and the side plates 21 define a hermetically sealed space therein which accommodates the motor rotor 12b for protection against contact with the laser gas. The can 20 and the side plates 21 are made of austenitic stainless steel such as SUS316L.

The excimer laser device has a controller 30 comprising a rotational speed detecting circuit 31, a processing circuit 32, and an inverter 33. The coil 14 is electrically connected to the rotational speed detecting circuit 31. The inverter 33 is electrically connected to the coils of the motor stator 12a for supplying electric energy to the motor stator 12a for rotating the motor 12.

A process of for detecting the rotational speed of the cross-flow fan 3 will be described below with reference to FIGS. 5A through 5F.

Figure 5B:
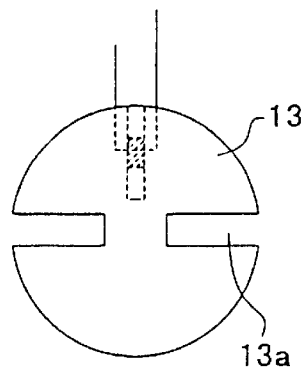
Figure 5C:
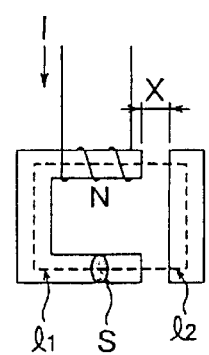
Figure 5D:
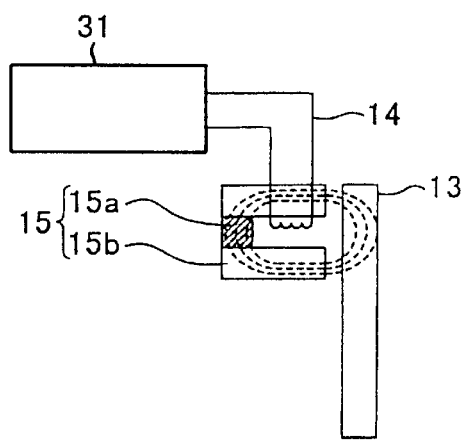
Figure 5E:
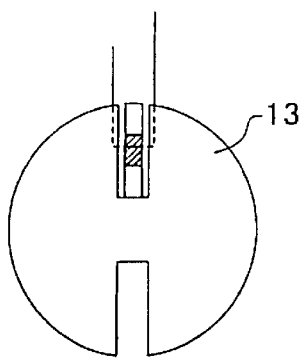

As shown in FIGS. 5B and 5E, the slit disk 13 has a pair of diametrically opposite slits 13a defined therein. Since the slits 13a defined in the slit disk 13 are responsible for balanced rotation of the slit disk 13, it is preferable for the slit disk 13 to have an even number of slits 13a. The U-shaped magnetic member 15 with the coil 14 mounted thereon is disposed in confronting relationship to the slit disk 13. The U-shaped magnetic member 15 has a width smaller than the width of the slits 13a.

When the slits 13a and the U-shaped magnetic member 15 with the coil 14 mounted thereon are relatively positioned as shown in FIGS. 5A and 5B., a magnetic flux $\Phi_1$ of a magnetic circuit created jointly by the slit disk 13 and the U-shaped magnetic member 15 is represented by the following equation (1):

$$\Phi_1 = NI/\{(l_1/\mu_1 S)+(l_2/\mu_2 S)+(2X/\mu_0 S)\} \tag{1}$$

where N: the number of turns of the coil 14, I: the current flowing through the coil 14, $l_1$: the length of the magnetic path of the U-shaped magnetic member 15, $l_2$: the length of the magnetic path of the slit disk 13, S: the cross-sectional area of the magnetic path, X: the cross-sectional area of the slit disk 13 and the U-shaped magnetic member 15 (see FIG. 5C), $\mu_1$: the magnetic permeability of the U-shaped magnetic member 15, $\mu_2$: the magnetic permeability of the slit disk 13, and $\mu_0$: the magnetic permeability of the vacuum.

Figure 5F:
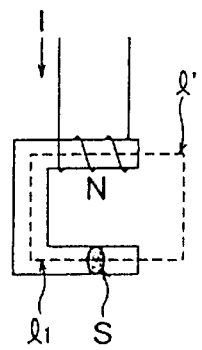

When the slits 13a and the U-shaped magnetic member 15 with the coil 14 mounted thereon are relatively positioned as shown in FIGS. 5D and 5E, a magnetic flux $\Phi_2$ of the magnetic circuit is expressed by the following equation (2):

$$\Phi_2 = NI/\{(l_2/\mu_1 S) + (l'/\mu_0 S)\} \tag{2}$$

where l': the length of the hypothetical magnetic path in the space (see FIG. 5F).

From the flux difference $\Delta\Phi$ between the magnetic flux $\Phi_1$ and the magnetic flux $\Phi_2$ and the time t in which the magnetic flux $\Phi_1$ changes to the magnetic flux $\Phi_2$ upon rotation of the slit disk 13, the coil 14 mounted on the U-shaped magnetic member 15 induces an electromotive force expressed by the following equation (3):

$$e = N\Delta\Phi/t \tag{3}$$

Therefore, when the slit disk 13 rotates, the magnetic flux of the magnetic path created jointly by the slits 13a and the U-shaped magnetic member 15 with the coil 14 mounted thereon changes from $\Phi_1$ to $\Phi_2$ to $\Phi_1$ as it passes through the slits 13a, so that an electromotive force is induced across the coil 14. FIG. 6 shows the manner in which the electromotive force induced across the coil 14 varies while the slit disk 13 is rotating at 3000 rpm. It can be seen from FIG. 6 that the induced electromotive force has a peak each time the magnetic flux passes through one of the slits 13a. The rotational speed detecting circuit 31 detects such peaks to detect the rotational speed of the shaft 4.

The rotational speed detecting circuit 31 has a better detecting sensitivity if the magnetic flux as it passes through each of the slits 13a varies to a larger extent and the generated electromotive force is greater. Therefore, the coil 14 is supplied with a bias current from the rotational speed detecting circuit 31 to generate a sufficient magnetic flux for inducing a desired electromotive force. Alternatively, as shown in FIGS. 3 and 5A, 5D, the U-shaped magnetic body 15 is constructed of the permanent magnet 15a and the yoke 15b to maintain a desired magnetic flux, thereby reducing or eliminating a steady current to flow in the coil 14.

As described above, the coil 14 is connected to the rotational speed detecting circuit 31, which detects an electromotive force induced across the coil 14 thereby to detect the rotational speed of the cross-flow fan 3. Information representing the detected rotational speed is sent from the rotational speed detecting circuit 31 to the processing circuit 32, which determines an operating state of the cross-flow fan 3. The processing circuit 32 then controls the inverter 33 to supply electric energy at an optimum voltage and frequency to the coils of the motor stator 12a, which gives an optimum revolving magnetic field to the motor rotor 12b. Even if the pressure of the laser gas in the casing 1 varies and so does the load on the cross-flow fan 3, the rotational speed of the cross-flow fan 3 is kept at a constant level. Consequently, the excimer laser device can operate stably at a high repetition rate.

In the above embodiment, the U-shaped magnetic body 15 is employed. However, another differently shaped magnetic body having two or more protrusions, e.g., an E-shaped magnetic body, may be employed.

Figure 7:
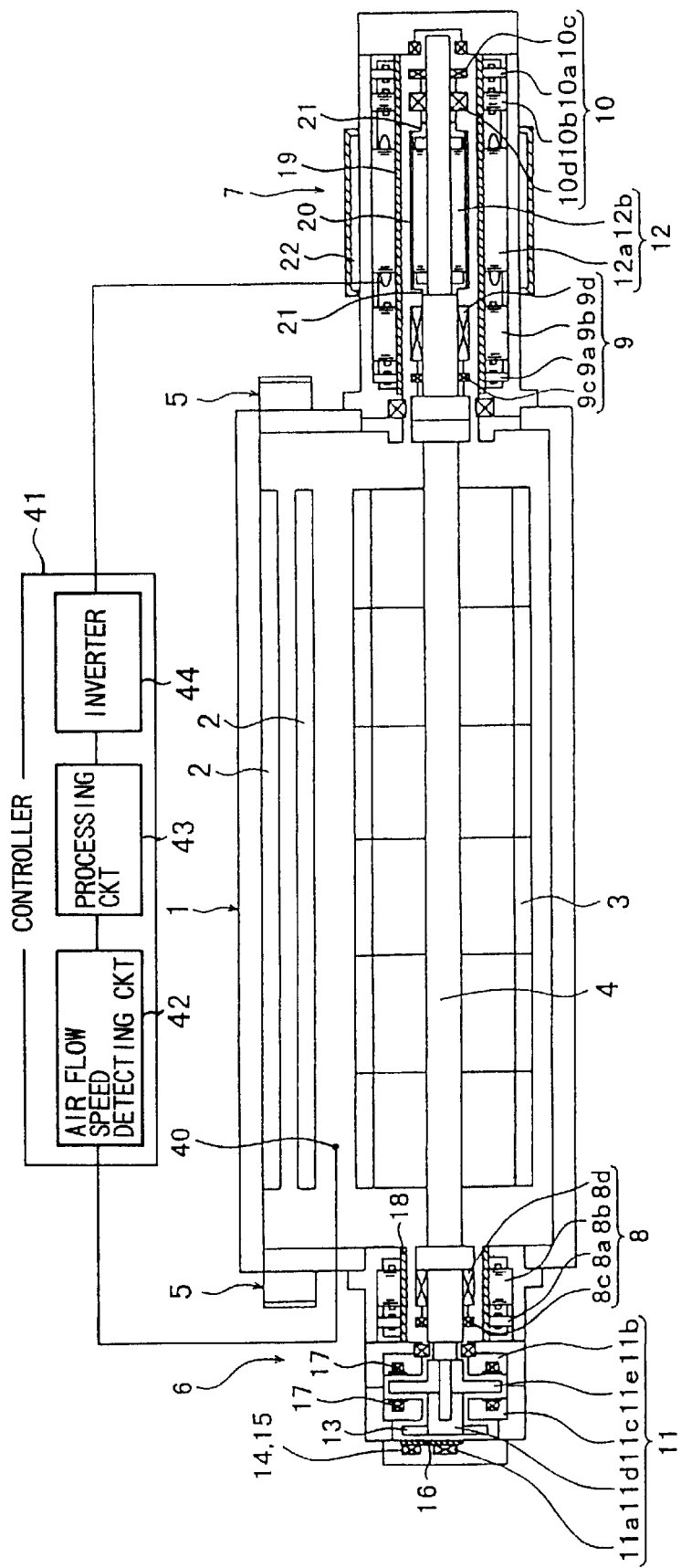
FIG. 7 is an axial cross-sectional view of an excimer laser device according to another embodiment of the present invention.

FIG. 7 shows an excimer laser device according to another embodiment of the present invention. Those parts of the excimer laser device shown in FIG. 7 which are identical to those of the excimer laser device shown in FIG. 2 are denoted by identical reference characters, and will not be described in detail below.

As shown in FIG. 7, the casing 1 houses an air flow speed sensor 40 which is electrically connected to an air flow speed detecting circuit 42 in a controller 41. The controller 41 has a processing circuit 43 and an inverter 44. The inverter 44 is electrically connected to the coils of the motor stator 12a for supplying electric energy to the motor stator 12a for rotating the motor 12.

Figure 8:
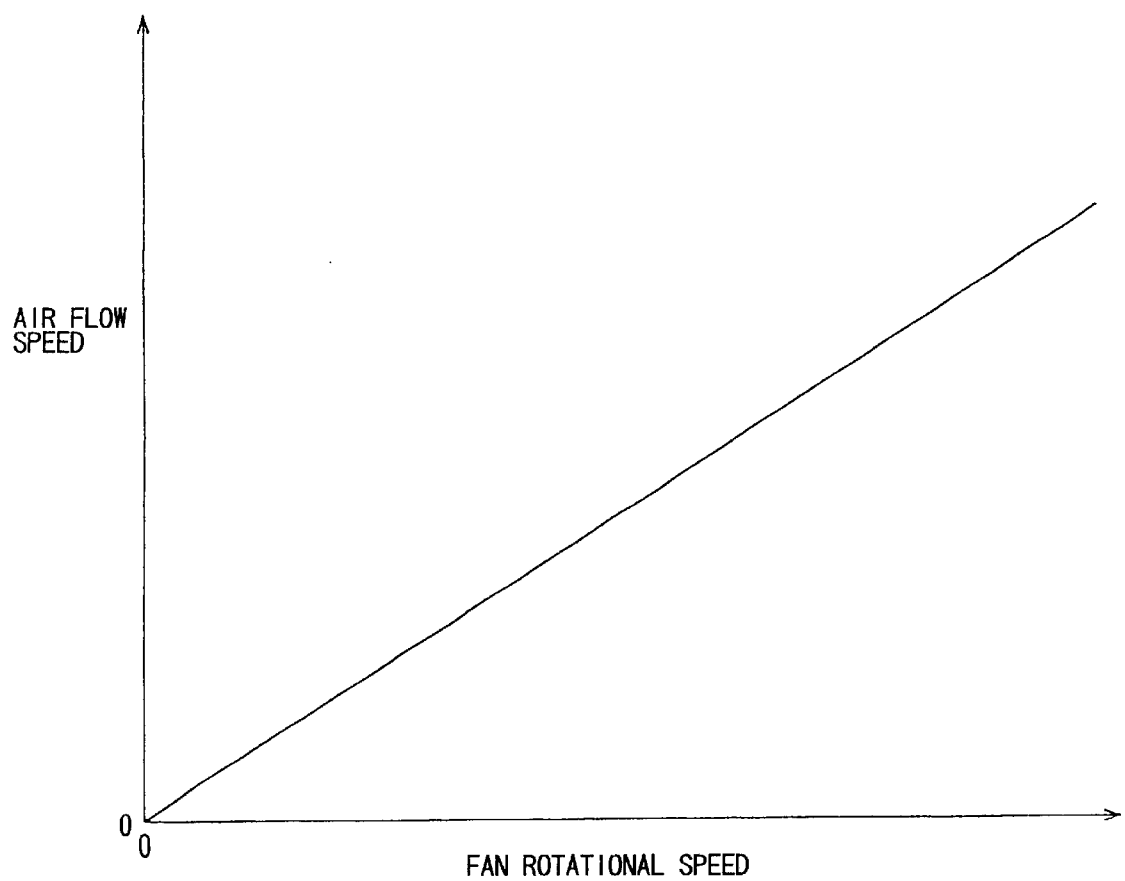
FIG. 8 is a diagram showing a calibration curve between fan rotational speeds and air flow speeds.

The processing circuit 43 stores a calibration curve between fan rotational speeds and air flow speeds shown in FIG. 8. An air flow speed detected by the air flow speed sensor 40 is sent to the processing circuit 43, which calculates the rotational speed of the cross-flow fan 3 from the detected air flow speed based on the calibration curve shown in FIG. 8. Based on the calculated rotational speed, the processing circuit 43 determines an operating state of the cross-flow fan 3. The processing circuit 43 then controls the inverter 44 to supply electric energy at an optimum voltage and frequency to the coils of the motor stator 12a, which gives an optimum revolving magnetic field to the motor rotor 12b.

Even if the pressure of the laser gas in the casing 1 varies and so does the load on the cross-flow fan 3, the rotational speed of the cross-flow fan 3 is kept at a constant level. Consequently, discharge pumping can be carried out between the main discharge electrodes 2 at a high repetition rate. Because of the characteristics of the cross-flow fan 3, the calibration curve between fan rotational speeds and air flow speeds remains unchanged even when the pressure of the laser gas varies.

Although certain preferred embodiments of the present invention have been shown and described in detail, it should be understood that various changes and modifications may be made therein without departing from the scope of the appended claims.

What is claimed is:

1. An excimer laser device comprising:
   a casing filled with a laser gas;
   a pair of main discharge electrodes disposed in said casing for producing an electric discharge to discharge-pump the laser gas at a high repetition rate;
   a fan for producing a high-speed laser gas flow between said main discharge electrodes;
   bearings, said fan having a rotational shaft rotatably supported by said bearings;
   a motor for actuating said fan;
   a rotational speed detecting device for detecting a rotational speed of said fan; and
   a control device for controlling at least one of a voltage and a frequency to be supplied to said motor based on the rotational speed of said fan detected by said rotational speed detecting device, thereby to control the rotational speed of said fan at a constant level,
   wherein said rotational speed detecting device comprises a disk of a magnetic material being fixedly mounted on said rotational shaft of said fan and disposed in a hermetically sealed space communicating with said casing, and a magnetic body disposed outside of said casing in confronting relationship to said disk with a can interposed therebetween.

2. An excimer laser device according to claim 1, wherein said disk has at least one slit defined therein.

3. An excimer laser device according to claim 2, wherein a U-shaped magnetic body with a coil mounted therein is disposed in confronting relationship to said slit of said disk.

4. An excimer laser device according to claim 3, said magnetic body has a width smaller than the width of said slit.

5. An excimer laser device according to claim 1, wherein a coil is mounted on said magnetic body for inducing an electromotive force upon rotation of said disk, thereby detecting the rotational speed of said fan from the electromotive force induced across said coil.

6. An excimer laser device according to claim 1, wherein said disk is made of permalloy.

7. An excimer laser device according to claim 1, wherein said disk is made of PC permalloy.

8. An excimer laser device according to claim 1, wherein said disk has a pair of diametrically opposite slits defined therein.

9. An excimer laser device according to claim 1, wherein said disk has an even number of diametrically opposite slits defined therein.

10. An excimer laser device according to claim 1, wherein said motor is an induction motor.

11. An excimer laser device according to claim 1, wherein said magnetic body partly or wholly comprises a permanent magnet.

* * * * *